(12) United States Patent
Chen et al.

(10) Patent No.: US 10,914,622 B2
(45) Date of Patent: Feb. 9, 2021

(54) APPARATUS AND METHOD FOR MEASURING MASS FLOW-RATES OF GAS, OIL AND WATER PHASES IN WET GAS

(71) Applicant: WUXI SEA PIONEERS TECHNOLOGIES CO., LTD, Jiangsu (CN)

(72) Inventors: Jige Chen, Wuxi (CN); Bin Xu, Wuxi (CN); Zhiyong Wu, Wuxi (CN); Zhengdong Cheng, Wuxi (CN); Hongdi Li, Wuxi (CN)

(73) Assignee: WUXI SEA PIONEERS TECHNOLOGIES CO., LTD., Wuxi (CN)

( * ) Notice: Subject to any disclaimer, the term of this patent is extended or adjusted under 35 U.S.C. 154(b) by 0 days.

(21) Appl. No.: 15/544,672

(22) PCT Filed: Jun. 12, 2016

(86) PCT No.: PCT/CN2016/085430
§ 371 (c)(1),
(2) Date: Apr. 3, 2019

(87) PCT Pub. No.: WO2017/206199
PCT Pub. Date: Dec. 7, 2017

(65) Prior Publication Data
US 2019/0219432 A1 Jul. 18, 2019

(30) Foreign Application Priority Data

May 30, 2016 (CN) .......................... 2016 1 0363834

(51) Int. Cl.
*G01F 1/74* (2006.01)
*G01N 23/12* (2018.01)
*G01F 1/88* (2006.01)

(52) U.S. Cl.
CPC .................. *G01F 1/74* (2013.01); *G01F 1/88* (2013.01); *G01N 23/12* (2013.01)

(58) Field of Classification Search
None
See application file for complete search history.

(56) References Cited

U.S. PATENT DOCUMENTS 6,265,713 B1 * 7/2001 Berard .................... G01F 1/363
250/269.3
6,389,908 B1 * 5/2002 Chevalier .......... G01N 33/2823
73/861.63

(Continued)

FOREIGN PATENT DOCUMENTS

| CN | 103759772 A | 4/2014 |
| CN | 105890689 A | 8/2016 |
| CN | 205785377 U | 12/2016 |

*Primary Examiner* — Harshad R Patel
(74) *Attorney, Agent, or Firm* — Morgan, Lewis & Bockius LLP; Jeffry S. Mann (57) ABSTRACT

The invention is directed to apparatus for measuring mass flow-rates of the gas, oil and water phases in a wet gas, comprising the following parts: a differential pressure flow meter, having a throat section, and a gamma ray detector, comprising a gamma ray emitter and a gamma ray receiver that are arranged in such a manner that gamma rays emitted from the gamma ray emitter can pass through the throat section in diametrical direction to reach the gamma ray receiver; wherein a radioactive source in the gamma-ray emitter is a multi-energy radioactive source that can naturally emit at least three energy gamma rays, and a thermostatic device is not used in the gamma ray receiver. The invention further relates to a metering method for measuring mass flow-rates of the gas, oil and water phases in a wet gas, in which the above apparatus is used. As for the apparatus according to the invention, neither a thermostatic device nor (Continued)

the calibration for the empty tube value is in need, and thus it is very suitable for the uses under water or down-hole.

4 Claims, 4 Drawing Sheets

(56) References Cited

U.S. PATENT DOCUMENTS

| | | | |
|---|---|---|---|
| 2008/0319685 A1* | 12/2008 | Xie | G01N 22/00 |
| | | | 702/45 |
| 2010/0140496 A1* | 6/2010 | Pinguet | G01N 23/083 |
| | | | 250/432 R |
| 2015/0134275 A1* | 5/2015 | Chen | G01F 1/88 |
| | | | 702/47 |
| 2016/0290846 A1* | 10/2016 | Chazal | E21B 47/10 |
| 2019/0339102 A1* | 11/2019 | Chen | G01F 1/36 |

* cited by examiner

APPARATUS AND METHOD FOR MEASURING MASS FLOW-RATES OF GAS, OIL AND WATER PHASES IN WET GAS

CROSS-REFERENCE TO RELATED APPLICATIONS

This application is a 371 of PCT/CN2016/085430 filed Jun. 12, 2016 which claims benefit of CN201610363834.8 filed on May 30, 2016 both of which are incorporated herein by reference in their entireties.

FIELD OF THE INVENTION

The invention is in the field of the wet gas flow metering. In particular, the invention relates to an apparatus and method for measuring the mass flow-rates of gas, oil and water phases in a wet gas, particularly suitable for use in underwater oil and gas productions.

BACKGROUND OF THE INVENTION

In the oil and gas industry, the oil well product refers to a gas-liquid mixed fluid simultaneously comprising liquid crude oil and natural gas, and the liquid and gas mixed liquid is called as "multiphase fluid" in the art. Said gas phase includes, for example, oil field gas or any gases which are non-condensable at room temperature, for example, such as methane, ethane, propane, butane and the like, and said liquid phase includes an oil phase, e.g., crude oil and other liquid additives which are dissolved in crude oil during the exploration of crude oil, and a water phase, e.g., formation water, water which is injected into oil wells during the exploration, and other liquid additives which are dissolved in the water phase. In practice, the phase separation between the oil phase and the water phase may occur, and it is also possible that the oil phase and the water phase are mixed together or entirely emulsified. How to real-time and accurately measure the gas flow and liquid flow in the gas-liquid mixed liquid explored from oil wells and how to further measure the flows of the oil, gas and water phases are essential data for production management and production optimization. When the mass fraction of gas phase in a multiphase fluid is higher than 80%, the multiphase fluid is customarily called as "wet gas". Materials that explored from submarine oil and gas fields and shale gas fields are wet gases.

Generally, flow meters include a volume flow meter and a mass flow meter. As for a fluid, in particular gas, its volume, being a function of the temperature and pressure, is a dependent variable, while the mass of the fluid is an amount that will not change with changes in the temperature and pressure. Flow values as measured by commonly-used flow meters, such as orifice flow meter, turbine flow meter, vortex flow meter, electromagnetic flow meter, rotor flow meter, ultrasonic flow meter and elliptical gear flow meter, are volume flow values of a fluid. In order to accomplish more precise measurements, flows as involved in scientific researches, production process controls, quality managements, economic accounting and trade handover are generally mass flows. Particularly, the pressure, temperature and components of the oil well product change with flowing conditions. A mass flow can more precisely reflect actual situations, and thus managements and productions of oil wells can be more reasonably optimized. However, by using the above volume flow meters, only volume flow of a fluid can be measured. Thus, people's demands cannot be satisfied, and generally, the density of the fluid should be further acquired so as to calculate the mass flow thereof. This method in which the volume flow of a fluid is measured and then according to the density of the fluid, the mass flow is calculated, involve many intermediate links, and thus the precision of the measured mass flow cannot be assured and increased.

For a wet gas, the mass flows of the gas, oil and water phases therein should be precisely measured. A conventional method as provided for measuring the mass flows is described as follows: after the volume flows of the gas, oil and water phases in the wet gas are measured, by combining the temperature and pressure of the fluid, the operating densities of the three phases are estimated by the means of correction, conversion and compensation, and thereafter, the mass flow of the each phase can be indirectly determined.

In the prior art, the most advanced method for the simultaneous measurement of the volume flows of the gas, oil and water phases in a wet gas is the gamma ray measurement method. Mechanisms of the method reside in measuring the total volume flow of the wet gas by using a Venturi tube, measuring the phase fractions of the gas, oil and water phases by using a dual-energy gamma ray monitor, and then obtaining the volume flows of the gas, oil, and water phases by multiplying the individual phase fractions of the gas, oil and water phases with the total volume flow. The procedure is specifically described as follows: a gamma ray emitter emits two gamma rays with the initial intensities of N10 and N20, and after the absorption with the wet gas, the two gamma rays reach a gamma ray receiver; the detected intensities of the two transmitted gamma rays are respectively expressed by N11 and N21 that have a relation as represented by the following formulae:

$$N11=N10*\exp(-\mu x) \quad (1),$$

$$N21=N20*\exp(-\mu x) \quad (2),$$

Wherein $\mu$ is the absorption coefficient of the wet gas, x is the transmission distance of the gamma rays along the wet gas, i.e., the pipe diameter D. The absorption coefficient $\mu$ further has the following relation with the gas absorption coefficient $\mu g$, the water absorption coefficient $\mu w$, and the oil absorption coefficient $\mu o$: $\mu=\alpha_g\mu g+\alpha_w\mu w+\alpha_o\mu o$, in which the $\alpha_g$, $\alpha_w$ and $\alpha_o$ are respectively the section linear phase fractions of the gas, oil, and water phases, and they are restricted by the following formula: $\alpha_g+\alpha_w+\alpha_o=1$ (3).

In the above three formulae, $\mu g$, $\mu w$, and $\mu o$ are known constants, x is the pipe diameter, also being a known value, and N11 and N21 are each a measurement value. Although N10 and N20 are the "initial intensities" of gamma rays in theory, actually, they are generally replaced by the "empty tube value", i.e., the transmission intensity measured by the gamma ray receiver when no wet gas is present in the pipe, and the value is deemed as the "initial intensity" of the gamma ray. Hence, in the above formulas, only $\alpha_g$, $\alpha_w$ and $\alpha_o$ are three unknowns, and thus by the simultaneous solution of the above formulae (1), (2) and (3), the above $\alpha_g$, $\alpha_w$ and $\alpha_o$ can be solved. Moreover, with the assumption that the gas, oil and water in the wet gas are homogenously mixed, the section linear phase fraction is considered to be a volume phase fraction, to further calculate the volume fractions of the gas, oil, and water phases. Then, by combining the total volume flow as measured by the Venturi tube, the volume flows of the gas, oil and water phases may be calculated, and further, by estimating the operation densities of the three phases, the volume flows are converted into the mass flows of the three phases.

As for existing wet gas flow meters with a gamma ray detector, the gamma ray detector includes a gamma ray emitter and a gamma ray receiver. The gamma ray emitter generally uses a dual-energy gamma-ray emitter, and in practice, a commonly-used solution for the dual-energy gamma ray emitter is that the warehouse of the dual-energy gamma source is a composite structure consisting of two $^{241}$Am sources or a structure of $^{133}$Ba single radioactive source. For example, in the case that the two $^{241}$Am radioactive sources are used, two gamma rays with the energy level of 59.5 keV are generated, in which one gamma ray, as a high energy gamma ray, directly goes through an absorption medium; the other gamma ray bombards a silver target, so as to excite silver to emit a low energy gamma ray with the energy level of 22 keV that goes through the absorption medium along the same route as that of the preceding high energy gamma ray; and the transmission intensities of the high energy gamma ray and the lower energy gamma ray together are detected by the gamma ray detector. However, due to differences in the material and geometrical size of the silver target, there is no definitive proportion relations between the initial intensities of the two gamma rays obtained as such. Further, other ways also can be used to obtain the dual-energy gamma ray. For example, by using a $^{133}$Ba radioactive source, the gamma rays as emitted by the radioactive source primarily have three energy levels, being 31 keV, 81 keV, and 356 keV, respectively, and a combination of any two of them, e.g., the combination of the gamma rays with the energy levels 31 keV and 81 keV, can be selected as the high energy gamma ray and the low energy gamma ray, respectively. As above described, by using the dual-energy gamma ray, the information with regard to the composition of the gas, oil and water phases in a wet gas fluid can be provided. As to more working principle and device details of the dual-energy gamma ray detector, please refer to books in the art, and no details are further discussed. Although some peoples have measured wet gas flows by using the $^{133}$Ba radioactive source, no one ever uses gamma rays with three energy levels before. This is for the reason that it is enough for the dual-energy gamma ray, by solving three unknown values as involved in three formulae, to accomplish the measurements of the flows of the gas, oil and water phases. Thus, it is not necessary to use a triple-energy gamma ray, and in contrast, the one more formula $N_{31}=N_{30}*\exp(-\mu x)$ can let peoples at a loss.

However, the gamma ray measurement method may be confronted to the following problems in practice: The gamma ray receiver generally uses a scintillation crystal counter or a photomultiplier tube counter as the counter for detecting the transmission intensity of gamma ray. However, these counters will exhibit varying degree of temperature drifts. That is, the detected signal with regard to the transmission intensity of gamma ray will take a drift with the change in the temperature of the courter, so that errors occur in the measurement of the signals with regard to the transmission intensity. More seriously, such a temperature drift not only can result in fluctuations in the directly-measured transmission intensity, but also can result in fluctuations in the "empty tube value" $N_{10}$ and $N_{20}$ which should have been the constant, and thus a person skilled in the art have to re-calibrate the "empty tube value" every few months, thereby to maintain the precision for solving the associated equations, and eliminate error accumulations. Currently, in order to technically eliminate the temperature drift phenomena, wet gas flow meters of gamma ray detection technique are in need of the provision of a thermostatic device for keep the temperature of the gamma ray receiver constant. Generally, the thermostatic device may be an electric heater, and via an internal power or an external power, a temperature controlling circuit is used to maintain the gamma ray receiver at a constant temperature that is higher than room temperature. Even so, the "empty tube value" should be newly calibrated in practice every several months, and else, the constant will not be changeless, it will seriously influence measurement accuracy and precision.

As for those wet gas flow meters that work above ground, keeping the temperature constant can be easily accomplished, because the electric source and the thermostatic device can be conveniently replaced and maintained at any time, and also, the regular calibration of the "empty tube value" is easily accomplished. However, as for those wet gas flow meters that are required to work underwater for long term, e.g., underwater flow meters that are used during explorations of seabed gas and oil, the design of a thermostatic device can bring some borings, primarily including great difficulties even no possibility in the replacement of the electric source and the maintenance of the thermostatic device. However, if the thermostatic device is not provided, the measurement of the flow meters can produce great errors. Most importantly, the regular calibration of the "empty tube value" is difficult, which can seriously influence the measurement accuracy.

Hence, there is a need in the art for a metering device having a relative simple structure for the online and precise measurement of the mass flows of the gas, oil and water phases in a wet gas and a corresponding metering method, and more desirably, for a metering device and method that can precisely measure the mass flows of the gas, oil and water phases in an underwater environment without a thermostatic device. It is more desirable to avoid the calibration of the "empty tube value" every several months. The invention is devoted to the simultaneous solution of the above problems.

BRIEF DESCRIPTION OF THE DRAWINGS

The reference signs have the following meanings: 1. gamma ray emitter; 2. radioactive source shield; 3. gamma ray receiver; 4. throat section; 5. combinational sensor, respectively for measuring the temperature and pressure of a measured fluid, and the differential pressure of the fluid that flows through the throttling tube; 6. differential pressure flow meter.

The above drawings are only used for illustrative descriptions of the technical concept and technical solution of the invention, and but not for restricting the invention in any way.

SUMMARY OF THE INVENTION

Figure 1:
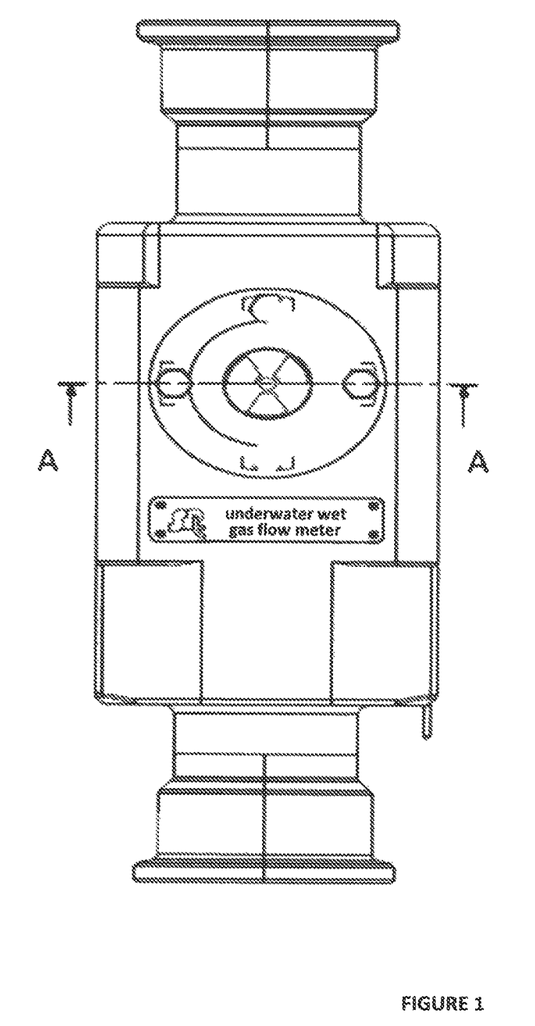
FIG. 1 is the front view of the metering device according to the invention.
Figure 2:
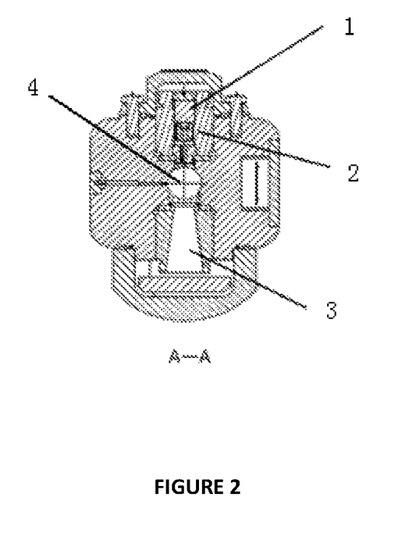
FIG. 2 is the sectional view of the metering device according to the invention along the "A-A" direction.
Figure 3:
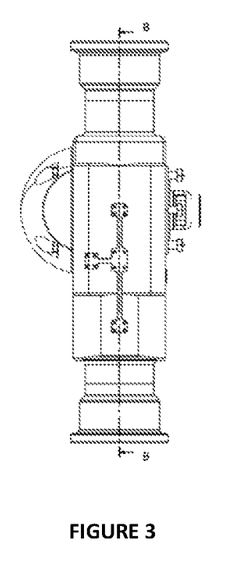
FIG. 3 is the side view of the metering device according to the invention.
Figure 4:
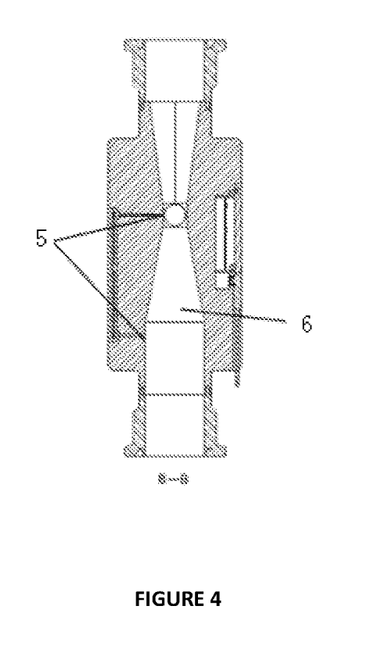
FIG. 4 is the sectional view of the metering device according to the invention along the "B-B" direction.

A first aspect of the invention is to provide a metering device for measuring mass flows of the gas, oil and water phases in a wet gas, comprising the following parts: a differential pressure flow meter, having a throat section, a gamma ray detector, comprising a gamma ray emitter and a gamma ray receiver that are arranged in such a manner that gamma rays can pass through the throat section in diametrical direction to reach the gamma ray receiver; wherein a radioactive source in the gamma-ray emitter is a multi-energy radioactive source that can naturally emit at least three energy gamma rays, and a thermostatic device is not used in the gamma ray receiver.

Therein, the differential pressure flow meter comprises a throttling round pipe, a temperature sensor and a pressure sensor. The basic principles of the differential pressure flow meter are described as follows: the throttling device, e.g., a Venturi tube, an orifice, or a nozzle, can be arranged in a round pipe filled with fluids, and the section of the throttling device with the minimum diameter is called as the throat section. When a fluid flows through the throttling device, a static differential pressure will be produced between the upstream and the throat of the throttling device. There is a fixed function relation between the static differential pressure and the flow of the fluid, and thus as long as the static differential pressure is measured, the flow can be calculated according to the flow formula.

The gamma ray detector comprises a gamma ray emitter and a gamma ray receiver that are respectively arranged at the two sides of the cross section of the throttling round pipe, in which the gamma ray emitted by the gamma ray emitter passes through the cross section in the diametrical direction to reach the gamma ray receiver; the gamma ray emitter comprises a multi-energy radioactive source that can naturally emit at least three energy gamma rays, abbreviated as "multi-energy radioactive source"; the gamma ray detector is a gamma ray detector capable of measuring and analyzing the full spectrum of gamma rays.

In addition, the metering device further comprises a temperature sensor for measuring the temperature of the wet gas and a differential pressure sensor for measuring the differential pressure between the inlet and throat of the Venturi tube.

A second aspect of the invention is to provide a metering method for measuring mass flows of the gas, oil and water phases in a wet gas, in which the metering device according to the first aspect of the invention is used, comprising the following steps: a) measuring the temperature T of a wet gas via a temperature sensor, measuring the differential pressure $\Delta P$ between the inlet and throat of a differential pressure tube via a differential pressure sensor, and measuring the transmission intensities $N_{x,1}$, $N_{x,2}$ and $N_{x,3}$ of the three energy gamma rays via a gamma ray detector; and b) calculating the total mass flow of the wet gas and the mass flows of the oil, gas and water phases according to the following formula:

$$\text{Total mass flow: } Q_m = \frac{C}{\sqrt{1-\beta^4}} \varepsilon \frac{\pi}{4} D^2 \sqrt{\Delta P * \rho_{mix}} \quad (4)$$

$$\text{Oil mass flow: } Q_{m,o} = Q_m * OMF \quad (5)$$

$$\text{Gas mass flow: } Q_{m,g} = Q_m * GMF \quad (6)$$

$$\text{Water mass flow: } Q_{m,w} = Q_m * WMF \quad (7)$$

Wherein, $$\text{Oil mass fraction: } OMF = \frac{Q_o}{Q_o + Q_w + Q_g}$$

$$\text{Gas mass fraction: } GMF = \frac{Q_g}{Q_o + Q_w + Q_g}$$

$$\text{Water mass fraction: } WMF = \frac{Q_w}{Q_o + Q_w + Q_g},$$

Wherein $Q_o$, $Q_g$, $Q_w$ are the linear mass of the oil, gas, and water phases respectively, specifically represented by the following formula:

$$Q_o = \theta - \frac{(k_2-1)(d_1-d_2)+(k_4-k_2)(d_1-\theta)}{(k_2-1)(k_1-k_3)+(k_4-k_2)(k_1-1)} - $$
$$\frac{(k_3-1)(d_1-d_2)+(k_3-k_1)(d_1-\theta)}{(k_3-1)(k_2-k_4)+(k_3-k_1)(k_4-1)}$$

$$Q_g = \frac{(k_2-1)(d_1-d_2)+(k_4-k_2)(d_1-\theta)}{(k_2-1)(k_1-k_3)+(k_4-k_2)(k_1-1)}$$

$$Q_w = \frac{(k_3-1)(d_1-d_2)+(k_3-k_1)(d_1-\theta)}{(k_3-1)(k_2-k_4)+(k_3-k_1)(k_4-1)},$$

Wherein, $\theta = \frac{\pi}{4}\left(\frac{C}{\sqrt{1-\beta^4}}\varepsilon D\right)^2 \Delta P$ $$k_1 = \frac{a_{g,1}-a_{g,2}}{a_{o,1}-a_{o,2}}$$

$$k_2 = \frac{a_{w,1}-a_{w,2}}{a_{o,1}-a_{o,2}}$$

$$d_1 = \frac{1}{a_{o,1}-a_{o,2}}\ln\left(\frac{N_{x,2}}{f_1 N_{x,1}}\right)$$

$$k_3 = \frac{a_{g,1}-a_{g,3}}{a_{o,1}-a_{o,3}}$$

$$k_4 = \frac{a_{g,1}-a_{g,3}}{a_{o,1}-a_{o,3}}$$

$$d_2 = \frac{1}{a_{o,1}-a_{o,3}}\ln\left(\frac{N_{x,3}}{f_2 N_{x,1}}\right).$$

The letters in the each formula have the following meanings:

C is the discharge coefficient of a throttling flow meter;
$\varepsilon$ is the compression correction factor of a fluid;
$\beta$ is the diameter ratio of a throttling flow meter;
D is the thickness as measured by gamma ray, i.e., the pipe diameter;
$\Delta P$ is the differential pressure, being a measurement value;
$N_{x,1}$, $N_{x,2}$ and $N_{x,3}$ are the transmission intensities of the three energy gamma rays, respectively, being measuring values;
$\rho_{mix}$ is the average sectional density on the measured cross section of the wet gas, $\rho_{mix}=(Q_o+Q_g+Q_w)/S$;
S is the area of the measured cross section, $$S = \frac{\pi}{4}D^2;$$

$\alpha$ is the linear mass absorption coefficient of the fluid to be measured to the gamma ray; the subscripts 1, 2 and 3 represent gamma rays having different energy levels respectively; the subscripts o, g and w represent oil, gas and water respectively;

$f_1$ and $f_2$ are the ratios of the initial intensities of the second gamma ray and third gamma ray relative to the initial intensity of the first gamma ray respectively.

As compared with conventional metering methods, the metering method according to the invention can avoid either the operation for correcting the temperature drift directed to the measurement results of the gamma ray receiver, or the operation for calibrating the "empty tube value".

The invention has the following advantages:

(1) The technical solution according to the invention uses a multi-energy radioactive source that can naturally emit more than three energy gamma rays. The intensity ratio of the three energy gamma rays as naturally emitted is fixed and constant, i.e., it cannot be changed by human, and the ratio will not be influenced by any changes in external temperature and pressure. Thus, the technical solution can bring great conveniences and simplifications to the solution of the metering formulae according to the invention, and it can accomplish the first direction measurement of the mass flows of gas, oil and water phases in a wet gas in the world without the need of the following operations: the volume flows of the three phases in the wet gas are measured, and then according to their densities, the mass flows of the phases can be calculated. The metering method is direct and simple, and its measurement principles have strict mathematical bases.

(2) The technical solution according to the invention can entirely eliminate the use of a thermostatic device for keeping the temperature of the gamma ray receiver constant, and thus the structure of the metering device according to the invention is greatly simplified. Furthermore, the metering device according to the invention can conveniently and reliably work underwater for a long term, without the obsessions of replacing the electric source of the thermostatic device and maintaining the thermostatic device.

(3) The technical solution according to the invention entirely eliminates the work for calibrating the "empty tube value" in the technological principle, and the metering device according to the invention is very suitable for long term work underwater or under oil wells.

(4) The technical solution according to the invention device fundamentally eliminates impacts of the temperature drift in the gamma ray measurement system, and thus the measurement results will be more accurate and more precise.

DETAILED DESCRIPTION OF THE INVENTION

In order to facilitate the understandings to the invention, some terms in the field of the wet gas metering are simply introduced as follows:

The term "mass flow" is meant to the mass of the flowing fluid per unit time, and in the SI unit system, its dimension may be expressed by kg/s.

The term "volume flow" is meant to the volume of the flowing fluid per unit time, and in the SI unit system, its dimension may be expressed by m³/s.

The term "linear mass" is meant to the mass of a fluid to be measured that is transmitted by a gamma ray per unit area when the gamma ray is used to measure the fluid. According to the properties of the transmitted fluid, there are three linear masses, $Q_o$, $Q_g$, and $Q_w$, being the oil linear mass, the gas linear mass and the water linear mass respectively. By utilizing the linear masses of the oil, gas and water, the following relation is present between the total mass flow and the pipe diameter:

$$Q_o + Q_g + Q_w = \frac{\pi}{4}\left(\frac{C}{\sqrt{1-\beta^4}}\varepsilon D\right)^2 \Delta P. \tag{8}$$

The term "radial" is meant to the direction of the diameter of the round section of the pipe through which the fluid flows.

The following text puts emphases on the metering method according to the invention for measuring mass flow of a wet gas.

In the invention, with a conventional differential pressure flow meter, e.g., a Venturi flow meter, the total mass flow of the wet gas can be attained by measuring the differential pressure, and then making calculations according to the following formula:

$$Q_m = \frac{C}{\sqrt{1-\beta^4}}\varepsilon \frac{\pi}{4} D^2 \sqrt{\Delta P \rho_{mix}} \tag{9}$$

In the formula, C is the discharge coefficient of the throttling flow meter, $\varepsilon$ is the compression correction factor of the fluid, $\beta$ is the diameter ratio of the throttling flow meter, $\Delta P$ the is the differential pressure, $\rho_{mix}$ is the density of the fluid (as for a wet gas, the density refers to a mixed density), and D is the pipe diameter.

Next, by using a gamma ray detector having a multi-energy radioactive source, the mass flows of the gas, oil and water phases in the wet gas are measured.

First of all, according to the characteristics of the gamma ray absorption, the following formulae are used:

Absorption formula of gamma ray 1:

$$\ln\left(\frac{N_{0,1}}{N_{x,1}}\right) = a_{o,1}Q_o + a_{g,1}Q_g + a_{w,1}Q_w \tag{10}$$

Absorption formula of gamma ray 2:

$$\ln\left(\frac{N_{0,2}}{N_{x,2}}\right) = a_{o,2}Q_o + a_{g,2}Q_g + a_{w,2}Q_w \tag{11}$$

Absorption formula of gamma ray 3:

$$\ln\left(\frac{N_{0,3}}{N_{x,3}}\right) = a_{o,3}Q_o + a_{g,3}Q_g + a_{w,3}Q_w. \tag{12}$$

Second, according to the relation between the mass flow and linear mass as measured by a Venturi flow meter, the following formula is used:

$$Q_o + Q_g + Q_w = \frac{\pi}{4}\left(\frac{C}{\sqrt{1-\beta^4}}\varepsilon D\right)^2 \Delta P, \tag{13}$$

wherein, $Q_o$, $Q_g$, $Q_w$ is the linear mass of the oil, gas and water phases, respectively.

According to the characteristics of the radioactive source, the $N_{o,1}$, $N_{o,2}$ and $N_{o,3}$ have the following proportion relation: $N_{0,2}=f_1 N_{0,1}$, $N_{0,3}=f_2 N_{0,1}$, in which $f_1$ and $f_2$, being well known proportion coefficients, are naturally constant coefficients, and thus they will not be changed with measurement conditions; due to the presence of the proportion coefficients, the three unknowns $N_{0,2}$, $N_{0,3}$, $N_{0,1}$ are actually equivalent to one unknown $N_{0,1}$.

Thus, according to the above four formula (10) to (13), the four unknowns $N_{0,1}$, $Q_w$, $Q_o$, $Q_g$ can be directly and precisely solved, so as to eliminate the measurement or calibration need for $N_{0,1}$. Because there is no need for the calibration to the $N_{0,1}$ (i.e., the "empty tube value"), impacts of the temperature drift in the gamma ray receiver on the measurement can be fundamentally avoided, and thus the provision of a thermostatic device is not in need in the gamma ray receiver.

In the equation set, $\alpha_{o,1}$, $\alpha_{o,2}$, $\alpha_{o,3}$, $\alpha_{g,1}$, $\alpha_{g,2}$, $\alpha_{g,3}$, and $\alpha_{w,1}$, $\alpha_{w,2}$, $\alpha_{w,3}$ are respectively the linear mass absorption coefficients of the oil, gas and water to gamma ray 1, gamma ray 2 and gamma ray 3 under working conditions, $f_1$, $f_2$ each are a fixed value and obtainable by the means of calibration, $N_{x,1}$, $N_{x,2}$, $N_{x,3}$, $\Delta P$ each are a measurement value. Thus, the linear masses can be directly solved according to the following formulae:

$$Q_o = \theta - \frac{(k_2-1)(d_1-d_2) + (k_4-k_2)(d_1-\theta)}{(k_2-1)(k_1-k_3) + (k_4-k_2)(k_1-1)} - \frac{(k_3-1)(d_1-d_2) + (k_3-k_1)(d_1-\theta)}{(k_3-1)(k_2-k_4) + (k_3-k_1)(k_4-1)} \quad (14)$$

$$Q_g = \frac{(k_2-1)(d_1-d_2) + (k_4-k_2)(d_1-\theta)}{(k_2-1)(k_1-k_3) + (k_4-k_2)(k_1-1)} \quad (15)$$

$$Q_w = \frac{(k_3-1)(d_1-d_2) + (k_3-k_1)(d_1-\theta)}{(k_3-1)(k_2-k_4) + (k_3-k_1)(k_4-1)} \quad (16)$$

Further, according to the Venturi mass flow formula $$Q_t = \frac{C}{\sqrt{1-\beta^4}} \varepsilon \frac{\pi}{4} D^2 \sqrt{\Delta P \rho_{mix}}$$

and the definition for the mass phase fraction, the mass flows of the gas, oil and water phases and the total mass flow can be finally obtained according to the following calculation formulas:

$$Q_{m,o} = Q_m * OMF \quad (17)$$

$$Q_{m,g} = Q_m * GMF \quad (18)$$

$$Q_{m,w} = Q_m * WMF \quad (19).$$

In the formula below, $$\theta = \frac{\pi}{4}\left(\frac{C}{\sqrt{1-\beta^4}} \varepsilon D\right)^2 \Delta P$$

$$k_1 = \frac{a_{g,1} - a_{g,2}}{a_{o,1} - a_{o,2}}$$

$$k_2 = \frac{a_{w,1} - a_{w,2}}{a_{o,1} - a_{o,2}}$$

$$d_1 = \frac{1}{a_{o,1} - a_{o,2}} \ln\left(\frac{N_{x,2}}{f_1 N_{x,1}}\right)$$

$$k_3 = \frac{a_{g,1} - a_{g,3}}{a_{o,1} - a_{o,3}}$$

$$k_4 = \frac{a_{w,1} - a_{w,3}}{a_{o,1} - a_{o,3}}$$

$$d_2 = \frac{1}{a_{o,1} - a_{o,3}} \ln\left(\frac{N_{x,3}}{f_2 N_{x,1}}\right),$$

C is the discharge coefficient of a throttling flow meter;
$\varepsilon$ is the compression correction factor of a fluid;
$\beta$ is the diameter ratio of a throttling flow meter;
D is the thickness as measured by gamma ray, i.e., the pipe diameter;
$\Delta P$ is the differential pressure;
$\rho_{mix}$ is the average sectional density on the measured cross section, $\rho_{mix} = (Q_o + Q_g + Q_w)/S$;
S is the area of the measured cross section, $$S = \frac{\pi}{4} D^2;$$

Oil mass fraction: $OMF = \dfrac{Q_o}{Q_o + Q_w + Q_g}$;

Gas mass fraction: $GMF = \dfrac{Q_g}{Q_o + Q_w + Q_g}$;

Water mass fraction: $WMF = \dfrac{Q_w}{Q_o + Q_w + Q_g}$;

$Q_o$, $Q_g$, $Q_w$ is the linear mass of the oil, gas and water in need of the solution, respectively;
$\alpha$ is the linear mass absorption coefficient of the fluid to be measured to the gamma ray; Q is the linear mass of the fluid to be measured along the direction of the gamma ray; the subscripts 1, 2 and 3 respectively represent gamma rays having different energy levels; the subscripts o, g, w respectively represent the oil, the gas and the water.

The metering device and metering method according to the invention are described directed to the measurements and calculations of the mass flows of the three phases (oil, gas and water) in a wet gas, and the metering device and metering method are likewise suitable for the measurements of a biphasic fluid to calculate the mass flows of the gas and liquid phases therein. Accordingly, by utilizing the two energy levels of the gamma ray radioactive source, the principles and method for calculating the mass flow can be determined by analogue according to the above contents.

The invention claimed is:

1. A method for measuring mass flow-rates of gas, oil and water phases in a wet gas, in which an apparatus comprising the following parts is used:
    (a) a differential pressure flow meter, having a throat section;
    (b) a gamma ray detector, comprising a gamma ray emitter and a gamma ray receiver that are arranged in such a manner that gamma rays emitted from the gamma ray emitter can pass through the throat section in diametrical direction to reach the gamma ray receiver; and
    (c) a radioactive source in the gamma-ray emitter is a multi-energy radioactive source that can naturally emit at least three energy gamma rays, and a thermostatic device is not used in the gamma ray receiver;
characterized in that the metering method comprises the following steps:
    i) measuring the temperature T of a wet gas via a temperature sensor, measuring the differential pressure $\Delta P$ between an inlet and a throat of a throttling tube as disposed in the differential pressure flow meter via a differential pressure sensor, and measuring the transmission intensities $N_{x,1}$, $N_{x,2}$ and $N_{x,3}$ of the three energy-levels gamma rays via the gamma ray detector; and ii) calculating the total mass flow of the wet gas and the mass flows of the oil, gas and water phases according to the following formula:

Total mass flow: $Q_m = \dfrac{C}{\sqrt{1-\beta^4}} \varepsilon \dfrac{\pi}{4} D^2 \sqrt{\Delta P * \rho_{mix}}$ Oil mass flow: $Q_{m,o} = Q_m * OMF$ Gas mass flow: $Q_{m,g} = Q_m * GMF$ Water mass flow: $Q_{m,w} = Q_m * WMF$, wherein Oil mass fraction: $OMF = \dfrac{Q_o}{Q_o + Q_w + Q_g}$ Gas mass fraction: $GMF = \dfrac{Q_g}{Q_o + Q_w + Q_g}$ Water mass fraction:

$$WMF = \dfrac{Q_w}{Q_o + Q_w + Q_g},$$

wherein $Q_o$, $Q_g$, $Q_w$ are the linear mass of the oil, gas, and water phases respectively, specifically represented by the following formula:

$$Q_o = \theta - \dfrac{(k_2-1)(d_1-d_2) + (k_4-k_2)(d_1-\theta)}{(k_2-1)(k_1-k_3) + (k_4-k_2)(k_1-1)} - \dfrac{(k_3-1)(d_1-d_2) + (k_3-k_1)(d_1-\theta)}{(k_3-1)(k_2-k_4) + (k_3-k_1)(k_4-1)}$$

$$Q_g = \dfrac{(k_2-1)(d_1-d_2) + (k_4-k_2)(d_1-\theta)}{(k_2-1)(k_1-k_3) + (k_4-k_2)(k_1-1)}$$

$$Q_w = \dfrac{(k_3-1)(d_1-d_2) + (k_3-k_1)(d_1-\theta)}{(k_3-1)(k_2-k_4) + (k_3-k_1)(k_4-1)}, \text{ wherein:}$$

$$\theta = \dfrac{\pi}{4}\left(\dfrac{C}{\sqrt{1-\beta^4}}\varepsilon D\right)^2 \Delta P$$

$$k_1 = \dfrac{a_{g,1} - a_{g,2}}{a_{o,1} - a_{o,2}}$$

$$k_2 = \dfrac{a_{w,1} - a_{w,2}}{a_{o,1} - a_{o,2}}$$

$$d_1 = \dfrac{1}{a_{o,1} - a_{o,2}} \ln\left(\dfrac{N_{x,2}}{f_1 N_{x,1}}\right)$$

$$k_3 = \dfrac{a_{g,1} - a_{g,3}}{a_{o,1} - a_{o,3}}$$

$$k_4 = \dfrac{a_{g,1} - a_{g,3}}{a_{o,1} - a_{o,3}}$$

$$d_2 = \dfrac{1}{a_{o,1} - a_{o,3}} \ln\left(\dfrac{N_{x,3}}{f_2 N_{x,1}}\right);$$

wherein, the letters in the each formula have the following meanings: C is the discharge coefficient of a throttling flow meter;

ε is the compression correction factor of a fluid;

β is the diameter ratio of a throttling flow meter;

D is the thickness as measured by gamma ray, i.e., the pipe diameter;

$\Delta P$ is the differential pressure, being a measurement value;

$f_1$ and $f_2$ respectively are the ratios of the initial intensities of the second gamma ray and third gamma ray relative to the initial intensity of the first gamma ray;

$N_{x,1}$, $N_{x,2}$ and $N_{x,3}$ are the transmission intensities of the three energy gamma rays, respectively, being measuring values;

$\rho_{mix}$ is the average sectional density on the measured cross section of the wet gas, $\rho_{mix} = (Q_o + Q_g + Q_w)/S;$ S is the area of the measured cross section, $$S = \dfrac{\pi}{4}D^2;$$

α is the linear mass absorption coefficient of the fluid to be measured to the gamma ray;

the subscripts 1, 2 and 3 represent gamma rays having different energy levels respectively; the subscripts o, g and w represent oil, gas and water respectively.

2. The method according to claim 1, characterized in that no temperature drift correction is carried out directed to the measurement results of the gamma ray receiver.

3. The method according to claim 1, characterized in that before the measurement, the calibration of the empty tube value is not in need.

4. The method according to claim 1, characterized in that the multi-energy radioactive source is a $^{133}$Ba radioactive source capable of emitting at least three gamma rays having the energy levels of 31 keV, 81 keV, and 356 keV, or a $^{176}$Lu radioactive source capable of emitting at least three gamma rays having the energy levels of 307 keV, 202 keV and 88 keV.

* * * * *